(12) United States Patent
Chun et al.

(10) Patent No.: US 9,094,252 B2
(45) Date of Patent: Jul. 28, 2015

(54) METHOD AND APPARATUS FOR FEEDBACK TRANSMISSION IN WIRELESS COMMUNICATION SYSTEM

(75) Inventors: Jin Young Chun, Anyang-si (KR); Wook Bong Lee, Anyang-si (KR); Bin Chul Ihm, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 812 days.

(21) Appl. No.: 13/384,204

(22) PCT Filed: Jul. 30, 2010

(86) PCT No.: PCT/KR2010/005028
§ 371 (c)(1),
(2), (4) Date: Jan. 13, 2012

(87) PCT Pub. No.: WO2011/014033
PCT Pub. Date: Feb. 3, 2011

(65) Prior Publication Data
US 2012/0113861 A1    May 10, 2012

Related U.S. Application Data

(60) Provisional application No. 61/230,117, filed on Jul. 31, 2009.

(30) Foreign Application Priority Data

Jul. 30, 2010  (KR) .................. 10-2010-0073771

(51) Int. Cl.
*H04L 5/00* (2006.01)
*H04L 25/03* (2006.01)
*H04L 1/00* (2006.01)
*H04L 1/06* (2006.01)

(52) U.S. Cl.
CPC ........ *H04L 25/03343* (2013.01); *H04L 1/0025* (2013.01); *H04L 1/0026* (2013.01); *H04L 1/0031* (2013.01); *H04L 1/0618* (2013.01); *H04L 5/0023* (2013.01); *H04L 5/0048* (2013.01); *H04L2025/03414* (2013.01); *H04L 2025/03426* (2013.01)

(58) Field of Classification Search
CPC ... H04L 1/0025; H04L 1/0026; H04L 1/0031; H04L 1/0618; H04L 2025/03414
See application file for complete search history.

(56) References Cited

U.S. PATENT DOCUMENTS

| | | | | |
|---|---|---|---|---|
| 2008/0240034 A1* | 10/2008 | Gollamudi | ................... | 370/330 |
| 2010/0273435 A1* | 10/2010 | Sun et al. | ................... | 455/67.13 |
| 2011/0103323 A1* | 5/2011 | Wang et al. | ................... | 370/329 |
| 2011/0222461 A1* | 9/2011 | Zhang et al. | ................... | 370/312 |
| 2014/0098777 A1* | 4/2014 | Lim et al. | ................... | 370/329 |

FOREIGN PATENT DOCUMENTS

| | | |
|---|---|---|
| KR | 10-2007-0094442 A | 9/2007 |
| KR | 10-2008-0040575 A | 5/2008 |
| KR | 10-2008-0073187 A | 8/2008 |
| KR | 10-2008-0086348 A | 9/2008 |

* cited by examiner

*Primary Examiner* — Khaled Kassim
(74) *Attorney, Agent, or Firm* — McKenna Long & Aldridge LLP

(57) ABSTRACT

A method and an apparatus for feedback transmission in a wireless communication system are provided. A terminal receives information about a short-term feedback period and a long-term feedback period from a base station, and then transmits to the base station short-term feedback information per short-term feedback period or long-term feedback information per long-term feedback period over a primary fast feedback channel (PFBSCH). The long-term feedback information contains an index of a subband subjected to channel measurement and a difference in measurement values that is a difference between a reference channel measurement value and a channel measurement value being measured.

8 Claims, 11 Drawing Sheets

METHOD AND APPARATUS FOR FEEDBACK TRANSMISSION IN WIRELESS COMMUNICATION SYSTEM

CROSS-REFERENCE TO RELATED APPLICATIONS

This application is a 35 U.S.C. §371 National Stage entry of International Application No. PCT/KR2010/005028, filed on Jul. 30, 2010, and claims the benefit to and of U.S. Provisional Application No. 61/230,117, filed Jul. 31, 2009 and Korean Application No. 10-2010-0073771, filed Jul. 30, 2010, all of which are incorporated by reference in their entirety herein.

BACKGROUND OF THE INVENTION

1. Field of the Invention

The present invention relates to wireless communications and, more particularly, to a method and apparatus for transmitting a feedback in a wireless communication system.

2. Related Art

The institute of electrical and electronics engineers (IEEE) 802.16e standard was adopted in 2007 as a sixth standard for international mobile telecommunication (IMT)-2000 in the name of 'WMAN-OFDMA TDD' by the ITU-radio communication sector (ITU-R) which is one of sectors of the international telecommunication union (ITU). An IMT-advanced system has been prepared by the ITU-R as a next generation (i.e., $4^{th}$ generation) mobile communication standard following the IMT-2000. It was determined by the IEEE 802.16 working group (WG) to conduct the 802.16m project for the purpose of creating an amendment standard of the existing IEEE 802.16e as a standard for the IMT-advanced system. As can be seen in the purpose above, the 802.16m standard has two aspects, that is, continuity from the past (i.e., the amendment of the existing 802.16e standard) and continuity to the future (i.e., the standard for the next generation IMT-advanced system). Therefore, the 802.16m standard needs to satisfy all requirements for the IMT-advanced system while maintaining compatibility with a mobile WiMAX system conforming to the 802.16e standard.

Technology for supporting reliable and high-speed data service may include multiple input multiple output (MIMO). MIMO technology can be used to improve the efficiency of data transmission and reception using multiple transmission antennas and multiple reception antennas. MIMO technology includes spatial multiplexing, transmit diversity, beam-forming and the like. An MIMO channel matrix according to the number of reception antennas and the number of transmission antennas can be decomposed into a number of independent channels. Each of the independent channels is called a layer or stream. The number of layers is called a rank.

A user equipment (UE) may transmit a feedback through uplink. The feedback may include channel information necessary for data transmission. A base station (BS) may schedule radio resources using the feedback received from the UE and transmit data. A closed loop scheme is a scheme of transmitting data by compensating for channel information included in a feedback from UE, and an open loop scheme is a scheme of transmitting data by not compensating for channel information included in a feedback from UE. A feedback may not be transmitted according to the open loop scheme, and a BS may do not use channel information included in a feedback although the channel information is included in the feedback. In general, in a wireless communication system, the open loop scheme may be applied to a channel environment for UE that moves at high speed, and the closed loop scheme may be applied to a channel environment for UE that moves at low speed. The open loop scheme is applied to a channel for UE that moves at high speed because the channel is greatly changed, making channel information, included in a feedback, difficult to be reliable. The closed loop scheme may be applied to a channel environment for UE that moves at low speed because the channel environment is relatively less changed and channel information included in a feedback is reliable and less sensitive to delay.

An uplink control channel may carry various kinds of pieces of feedback information. The pieces of feedback information may include a channel quality indicator (CQI), an MIMO feedback, acknowledgement/non-acknowledgement (ACK/NACK), an uplink synchronization signal, a bandwidth request, etc. The pieces of feedback information may be combined in various ways according to a channel environment or a predetermined configuration and transmitted. The pieces of feedback information may be divided into short-term feedback information transmitted in a short period and long-term feedback information transmitted in a relatively long period depending on a type of the feedback information.

There is a need for a method of efficiently transmitting the short-term feedback information and the long-term feedback information.

SUMMARY OF THE INVENTION

The present invention provides a method and apparatus for transmitting a feedback in a wireless communication system.

In an aspect, a method of transmitting a feedback in a wireless communication system is provided. The method includes receiving information on a short-term feedback period and a long-term feedback period from a base station, and transmitting short-term feedback information by the short-term feedback period or long-term feedback information by the long-term feedback period to the base station on a primary fast feedback channel (PFBCH), wherein the long-term feedback information comprises an index of a subband which is a subject of channel measurement and a difference measurement value which is a difference between a reference channel measurement value and a measured channel measurement value. The difference measurement value may be a difference value between a previously transmitted channel quality indicator (CQI) and a measured CQI. The difference measurement value may be represented by a difference of actual transmission power or by a difference of a modulation and coding scheme (MCS) level. The difference measurement value may be a difference between a previously transmitted precoding matrix indicator (PMI) and a measured PMI. The difference measurement value may be an index difference when a correlation between a previously transmitted PMI and a measured PMI is represented by an index. The long-term feedback information may be the index of the subband and an index indicating feedback information of a PFBCH encoding type 1 corresponding to the difference measurement value. The index indicating the feedback information of the PFBCH encoding type 1 may be an integer which is one of 1 to 55. The long-term feedback period may be an odd-numbered multiple of the short-term feedback period. The transmitting the short-term feedback information or the long-term feedback information may comprise generating a feedback sequence based on the short-term feedback information or the long-term feedback information, mapping the generated feedback sequence to a feedback symbol by modulating and repeating the generated feedback sequence, and mapping the feedback symbol to subcarriers allocated to the feedback channel.

In another aspect, an apparatus for transmitting a feedback in a wireless communication system is provided. The apparatus includes a radio frequency (RF) unit configured for receiving information on a short-term feedback period and a long-term feedback period and to transmit short-term feedback information by the short-term feedback period or long-term feedback information by the long-term feedback period on a primary fast feedback channel (PFBCH), and a processor, coupled to the RF unit, configured for processing the short-term feedback information or the long-term feedback information, wherein the long-term feedback information comprises an index of a subband which is a subject of channel measurement and a difference measurement value which is a difference between a reference channel measurement value and a measured channel measurement value. The difference measurement value may be a difference value between a previously transmitted channel quality indicator (CQI) and a measured CQI. The difference measurement value may be a difference between a previously transmitted precoding matrix indicator (PMI) and a measured PMI. The long-term feedback information may be the index of the subband and an index indicating feedback information of a PFBCH encoding type 1 corresponding to the difference measurement value. The index indicating the feedback information of the PFBCH encoding type 1 may be an integer which is one of 1 to 55. The long-term feedback period may be an odd-numbered multiple of the short-term feedback period.

An efficient feedback can be performed by minimizing short-term feedback information punctured by the transmission of long-term feedback information.

DESCRIPTION OF EXEMPLARY EMBODIMENTS

A technology below can be used in a variety of wireless communication systems, such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented using radio technology, such as universal terrestrial radio access (UTRA) or CDMA2000. TDMA can be implemented using radio technology, such as global system for mobile communications (GSM)/general packet radio service (GPRS)/enhanced data rates for GSM evolution (EDGE). OFDMA can be implemented using radio technology, such as IEEE 802.11(Wi-Fi), IEEE 802.16 (WiMAX), IEEE 802-20, or Evolved UTRA (E-UTRA). IEEE 802.16m is the evolution of IEEE 802.16e, and it provides a backward compatibility with an IEEE 802.16e-based system. UTRA is part of a universal mobile telecommunications system (UMTS). 3rd generation partnership project (3GPP) long term evolution (LTE) is part of evolved UMTS (E-UMTS) using evolved-UMTS terrestrial radio access (E-UTRA), and it adopts OFDMA in downlink (DL) and SC-FDMA in uplink (UL). LTE-A (advanced) is the evolution of 3GPP LTE.

IEEE 802.16m is chiefly described as an example in order to clarify the description, but the technical spirit of the present invention is not limited to IEEE 802.16m.

Figure 1:
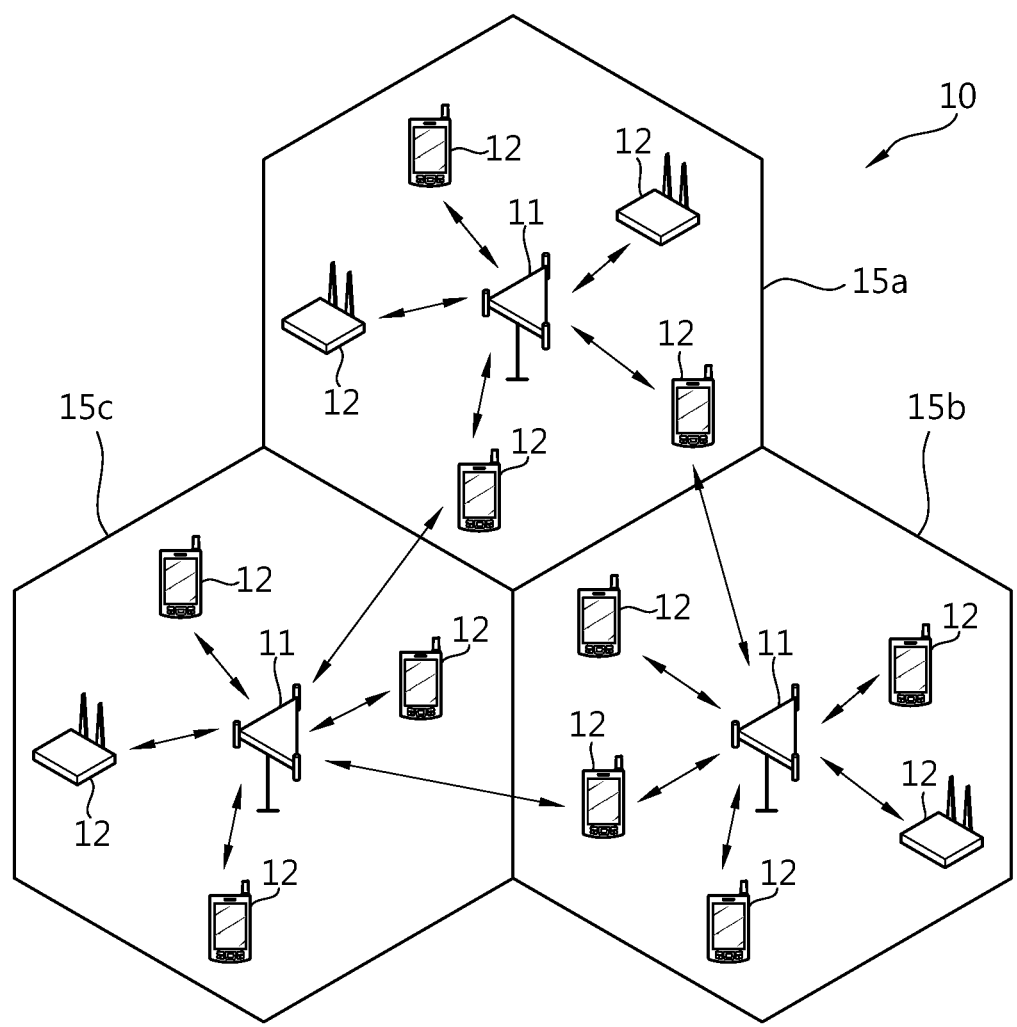
FIG. 1 shows a wireless communication system.

FIG. 1 shows a wireless communication system.

Referring to FIG. 1, the wireless communication system 10 includes one or more base stations (BSs) 11. The BSs 11 provide communication services to respective geographical areas (in general called 'cells') 15a, 15b, and 15c. Each of the cells can be divided into a number of areas (called 'sectors'). A user equipment (UE) 12 can be fixed or mobile and may be referred to as another terminology, such as a mobile station (MS), a mobile terminal (MT), a user terminal (UT), a subscriber station (SS), a wireless device, a personal digital assistant (PDA), a wireless modem, or a handheld device. In general, the BS 11 refers to a fixed station that communicates with the UEs 12, and it may be referred to as another terminology, such as an evolved-NodeB (eNB), a base transceiver system (BTS), or an access point.

The UE belongs to one cell. A cell to which a UE belongs is called a serving cell. A BS providing the serving cell with communication services is called a serving BS. A wireless communication system is a cellular system, and so it includes other cells neighboring a serving cell. Other cells neighboring the serving cell are called neighbor cells. A BS providing the neighbor cells with communication services is called as a neighbor BS. The serving cell and the neighbor cells are relatively determined on the basis of a UE.

This technology can be used in the downlink (DL) or the uplink (UL). In general, DL refers to communication from the BS 11 to the UE 12, and UL refers to communication from the UE 12 to the BS 11. In the DL, a transmitter may be part of the BS 11 and a receiver may be part of the UE 12. In the UL, a transmitter may be part of the UE 12 and a receiver may be part of the BS 11.

Figure 2:
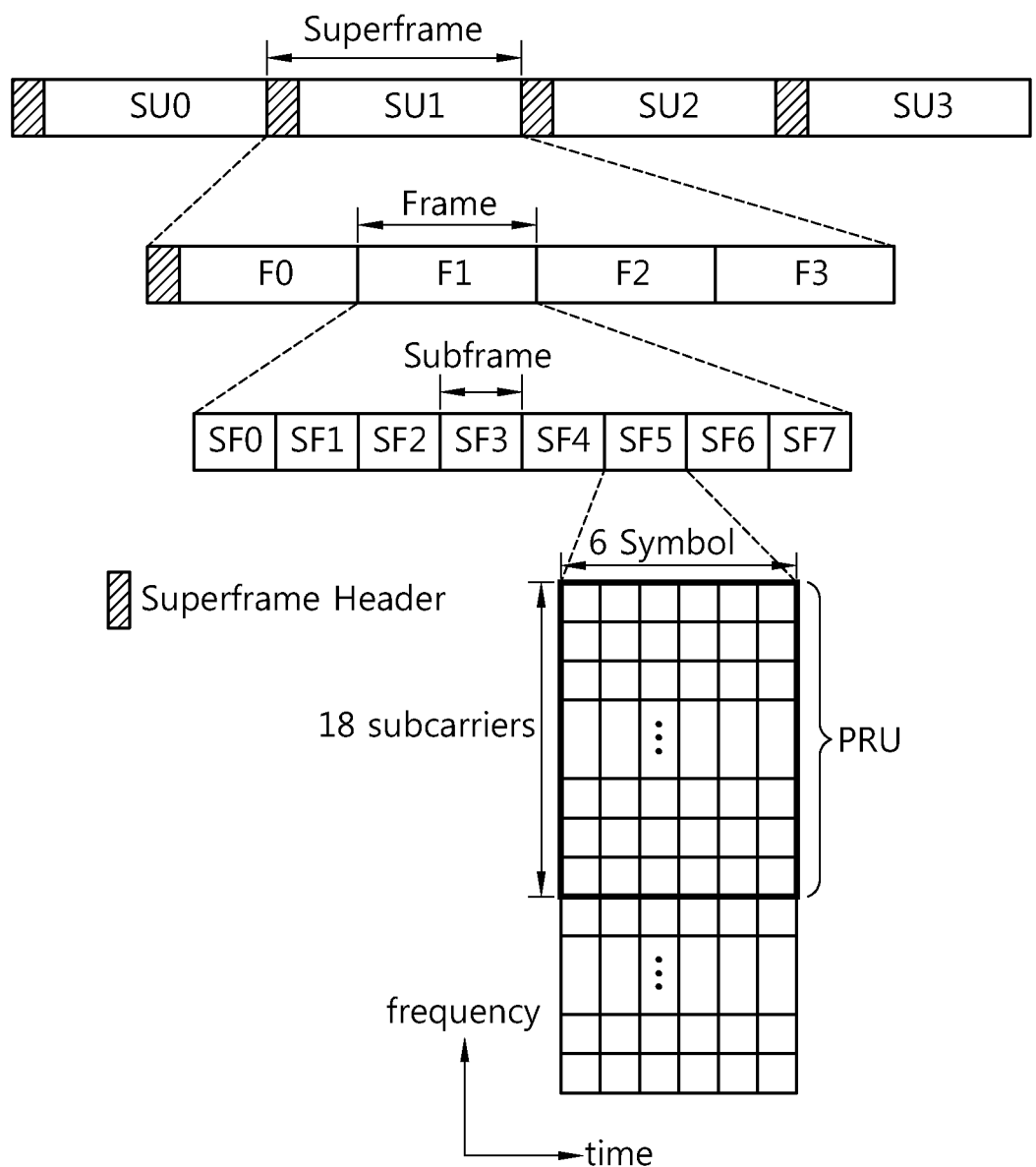
FIG. 2 shows an example of a frame structure.

FIG. 2 shows an example of a frame structure.

Referring to FIG. 2, a superframe (SF) includes a superframe header (SFH) and four frames F0, F1, F2, and F3. Each frame may have the same length in the SF. Although it is shown that each SF has a length of 20 milliseconds (ms) and each frame has a length of 5 ms, the present invention is not limited thereto. A length of the SF, the number of frames included in the SF, the number of SFs included in the frame, or the like can change variously. The number of SFs included in the frame may change variously according to a channel bandwidth and a cyclic prefix (CP) length.

One frame includes 8 subframes SF0, SF1, SF2, SF3, SF4, SFS5 SF6, and SF7. Each subframe can be used for uplink or downlink transmission. One subframe includes a plurality of orthogonal frequency division multiplexing (OFDM) symbols in a time domain, and includes a plurality of subcarriers in a frequency domain. An OFDM symbol is for representing one symbol period, and can be referred to as other terminologies such as an OFDM symbol, an SC-FDMA symbol, etc., according to a multiple access scheme. The subframe can consist of 5, 6, 7, or 9 OFDMA symbols. However, this is for exemplary purposes only, and thus the number of OFDMA symbols included in the subframe is not limited thereto. The number of OFDMA symbols included in the subframe may change variously according to a channel bandwidth and a CP length. A subframe type may be defined according to the number of OFDMA symbols included in the subframe. For example, it can be defined such that a type-1 subframe includes 6 OFDMA symbols, a type-2 subframe includes 7 OFDMA symbols, a type-3 subframe includes 5 OFDMA symbols, and a type-4 subframe includes 9 OFDMA symbols. One frame may include subframes each having the same type. Alternatively, one frame may include subframes each having a different type. That is, the number of OFDMA symbols included in each subframe may be identical or different in one frame. Alternatively, the number of OFDMA symbols included in at least one subframe of one frame may be different from the number of OFDMA symbols of the remaining subframes of the frame.

Time division duplex (TDD) or frequency division duplex (FDD) may be applied to the frame. In the TDD, each subframe is used in uplink or downlink transmission at the same frequency and at a different time. That is, subframes included in a TDD frame are divided into an uplink subframe and a downlink subframe in the time domain. A switching point refers to a point where a transmission direction is changed from an uplink region to a downlink region or from a downlink region to an uplink region. In the TDD, the number of the switching points in each frame may be two. In the FDD, each subframe is used in uplink or downlink transmission at the same time and at a different frequency. That is, subframes included in an FDD frame are divided into an uplink subframe and a downlink subframe in the frequency domain. Uplink transmission and downlink transmission occupy different frequency bands and can be simultaneously performed.

A superframe header (SFH) may carry an essential system parameter and system configuration information. The SFH may be located in a first subframe of a superframe. The SFH may occupy last 5 OFDMA symbols of the first subframe. The SFH can be classified into a primary-SFH (P-SFH) and a secondary-SFH (S-SFH). The P-SFH and the S-SFH may be transmitted in every superframe. The S-SFH may be transmitted in two consecutive superframes. Information transmitted on the S-SFH may be classified into three sub-packets, i.e., an S-SFH SP1, an S-SFH SP2, and an S-SFH SP3. Each sub-packet can be transmitted periodically with a different period. Information transmitted in the S-SFH SP1, the S-SFH SP2, and the S-SFH SP3 may have different importance from one another. The S-SFH SP1 may be transmitted with a shortest period, and the S-SFH SP3 may be transmitted with a longest period. The S-SFH SP1 includes information on network re-entry. The S-SFH SP2 includes information on initial network entry and network discovery. The S-SFH SP3 includes other important system information.

Figure 3:
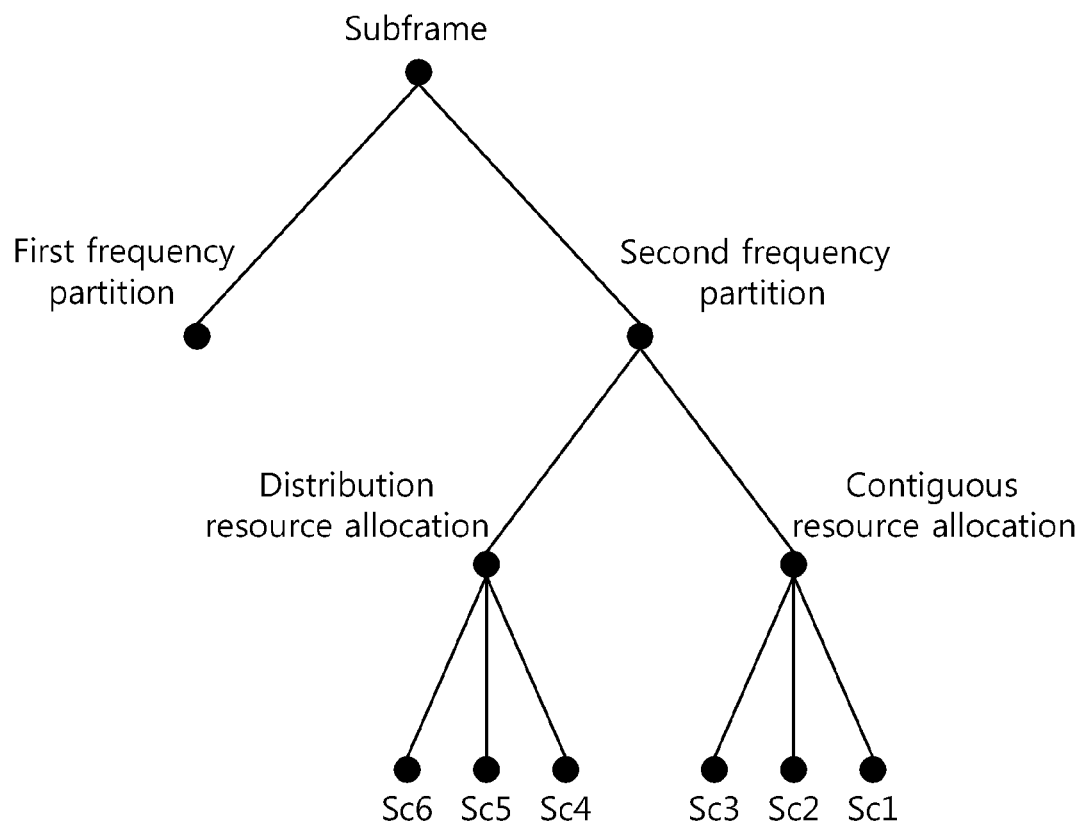
FIG. 3 shows an example of an uplink resource structure.

FIG. 3 shows an example of an uplink resource structure.

Referring to FIG. 3, an uplink subframe can be divided into at least one frequency partition (FP). Herein, the subframe is divided into two FPs (i.e., FP1 and FP2) for example. However, the number of FPs in the subframe is not limited thereto. The number of FPs can be 4 at most. Each FP consists of at least one physical resource unit (PRU) across all available OFDMA symbols in a subframe. In addition, Each FP may include contiguous/localized PRUs and/or distributed PRUs. Each FP can be used for other purposes such as fractional frequency reuse (FFR). In FIG. 3, the second FP (i.e., FP2) includes the distributed resource allocation and the contiguous resource allocation. 'Sc' denotes a subcarrier.

The PRU is a basic physical unit for resource allocation. The PRU consists of a Psc consecutive subcarriers and Nsym consecutive OFDMA symbols. Nsym may be equal to the number of OFDMA symbols included in one subframe. Therefore, Nsym can be determined according to a subframe type. For example, when one subframe consists of 6 OFDMA symbols, the PRU may be defined with 18 subcarriers and 6 OFDMA symbols.

A logical resource unit (LRU) is a basic logical unit for distributed resource allocation and contiguous resource allocation. The LRU consists of a Psc consecutive subcarriers and Nsym consecutive OFDMA symbols. A size of a LRU for transmitting a control channel is equal to a size of a LRU for transmitting data. A plurality of users may share one control LRU. Also, the LRU may include pilot. Therefore, a desired number of subcarriers for one LRU depends on the number of allocated pilots and the existence of control channel.

A distributed logical resource unit (DLRU) may be used to obtain a frequency diversity gain. The DLRU includes a subcarrier group distributed in a resource region in one frequency partition. The DLRU has the same size as the PRU. A minimum unit for consisting the DLRU may be a tile. A size of an uplink tile is 6 subcarriers×Nsym OFDMA symbols. Nsym may be changed according to a subframe type.

A contiguous logical resource unit (CLRU) may be used to obtain a frequency selective scheduling gain. The CLRU includes a subcarrier group contiguous in a resource region. The CLRU has the same size as the PRU.

Hereafter, a control channel used for transmitting a control signal or a feedback signal is described. The control channel may be used for transmission of various kinds of control signals for communication between a base station and a user equipment. The control channel described below may be applied to an uplink control channel and a downlink control channel.

The control channel is designed by taking the following points into consideration.

(1) A plurality of tiles included in a control channel can be distributed over the time domain or the frequency domain in order to obtain a frequency diversity gain. For example, assuming that a DRU includes three tiles each including six consecutive subcarriers on six OFDM symbols, the control channel includes the three tiles, and each of the tiles can be distributed over the frequency domain or the time domain. In some embodiments, the control channel can include at least one tile including a plurality of mini-tiles, and the plurality of mini-tiles can be distributed over the frequency domain or the time domain. For example, the mini-tile can consist of (OFDM symbols×subcarriers)=6×6, 3×6, 2×6, 1×6, 6×3, 6×2, 6×1 or the like. Assuming that a control channel, including (OFDM symbols×subcarriers) of IEEE 802.16e=the tiles of a 3×4 PUSC structure, and a control channel, including mini-tiles, are multiplexed through a Frequency Division Multiplexing (FDM) method, the mini-tiles can consist of (OFDM symbols×subcarriers)=6×2, 6×1, etc. When taking only the control channel, including the mini-tiles, into consideration, the mini-tiles can consist of (OFDM symbols×subcarriers)=6×2, 3×6, 2×6, 1×6 or the like.

(2) To support a high-speed mobile station, the number of OFDM symbols constituting a control channel must be a minimum. For example, in order to support a mobile station moving at the speed of 350 km/h, the number of OFDM symbols constituting a control channel is properly 3 or less.

(3) The transmission power of a mobile station per symbol is limited. To increase the transmission power of a mobile station per symbol, it is advantageous to increase the number of OFDM symbols constituting a control channel. Accordingly, a proper number of OFDM symbols has to be determined with consideration taken of (2) a high-speed mobile station and (3) the transmission power of a mobile station per symbol.

(4) For coherent detection, pilot subcarriers for channel estimation have to be uniformly distributed over the time domain or the frequency domain. The coherent detection method is used to perform channel estimation using a pilot and then find data loaded on data subcarriers. For the power boosting of pilot subcarriers, the number of pilots per OFDM symbol of a control channel has to be identical in order to maintain the same transmission power per symbol.

(5) For non-coherent detection, a control signal has to consist of orthogonal codes/sequences or semi-orthogonal codes/sequences or has to be spread.

Uplink control channels may include a fast feedback channel (FFBCH), a hybrid automatic repeat request (HARD) feedback channel (HFBCH), a ranging channel, a bandwidth request channel (BRCH), and so on. Information, such as a CQI, an MIMO feedback, ACK/NACK, an uplink synchronization signal, and a bandwidth request, may be transmitted through the uplink control channel. The FFBCH, the HFBCH, the ranging channel, the BRCH, etc. may be located in any place of an uplink subframe or a frame.

The uplink control channel may be allocated through downlink control information that is transmitted from a BS through downlink. The downlink control information may be broadcast to all the UEs or may be transmitted to each UE in unicast service. The P-SFH or the S-SFH mentioned above is a broadcast downlink control signal, and a plurality of advanced-MAP information elements (A-MAP IEs) may be defined as basic elements of unicast service control.

A feedback allocation A-MAP IE for the dynamic allocation or release of a feedback channel, from among the plurality of A-MAP IEs, may be transmitted to UE. Feedback channels that may be allocated or released by the feedback allocation A-MAP IE include a PFBCH and an SFBCH. If feedback channels already allocated to UE for a downlink carrier exist and new feedback channels for the relevant downlink carrier are allocated again, the original feedback channels may be automatically released.

Table 1 is an example of a feedback allocation A-MAP IE for the allocation of feedback channels.

TABLE 1

| Syntax | Size in bits | Description/Notes |
|---|---|---|
| Feedback-Allocation-MAP_IE( ) { | — | — |
| A-MAP IE Type | [4] | Feedback Allocation A-MAP IE = 0b0010 |
| Channel Index | Variable | Feedback channel index within the UL fast feedback control resource region |
| Short-term Feedback Period (p) | [3] | A feedback is transmitted on the FBCH every $2^p$ frames |
| Long-term Feedback Period (q) | [2] | A long-term feedback is transmitted on the FBCH every $2^q$ short-term feedback opportunity<br>If q = 0b00, long-term feedback is not used. |
| Frame offset | [3] | The AMS starts reporting at the frame of which the number has the same 3 LSB as the specified frame offset. If the current frame is specified, the AMS should start reporting in eight frames |
| Allocation Duration(d) | [3] | A FBCH is transmitted on the FBCH channels indexed by Channel Index for $8 * 2^d$ frames. If d = 0b000, the FBCH is deallocated. If d = 0b111, the AMS should report until the ABS command for the AMS to stop. |
| ACK Allocation Flag<br>If (ACK Allocation Flag == 0b1){ | [1] | Indicate if one ACK channel is allocated |
| HFA | [3] | HARQ feedback channel allocation for Feedback Channel De-allocation confirmation |
| }<br>MaxMt | Variable [1-2] | Variable number of bits - depends on number of transmit antenna Nt<br>If Nt = 2 (SU-MIMO and MU-MIMO):<br>0b0: 1, 0b1: 2<br>If Nt = 4 (SU-MIMO and MU-MIMO):<br>0b00: 1, 0b01: 2, 0b10: 3, 0b11: 4<br>If Nt = 8 (SU-MIMO):<br>0b000: 1, 0b001: 2, 0b011: 4, 0b111: 8<br>If Nt = 8 ÷ (MU-MIMO):<br>0b00: 1, 0b01: 2, 0b10: 3, 0b11: 4 |
| MFM | [3] | MIMO Feedback Mode as defined in Table 691 |
| If (MFM = 2, 3, 5, 6) {<br>Feedback Format | [2] | |
| }<br>If(MFM=0,1,4,7){<br>FPI | [2] | Frequency partition indication: ABS indicate AMS to send wideband CQI and STC rate of the frequency partition and reuse factor in the future:<br>0b00: Frequency partition index 0<br>0b01: Frequency partition index 1<br>0b10: Frequency partition index 2<br>0b11: Frequency partition index 3 |
| }<br>If (MFM = 0,1 & Long-term Feedback Period != 0b00)<br>{ | | |

TABLE 1-continued

| Syntax | Size in bits | Description/Notes |
| --- | --- | --- |
| Long term FPI | [2] | Frequency partition indication: ABS indicate AMS to send wideband CQI and STC rate for the second frequency partition using long term feedback:<br>0b00: Frequency partition index 0<br>0b01: Frequency partition index 1<br>0b10: Frequency partition index 2<br>0b11: Frequency partition index 3 |
| }<br>If (MFM == 3,4,6,7) {<br>  CM | [2] | CL SU and MU MIMO<br>Codebook Feedback Mode and Codebook Coordination Enable<br>0b00: standard with CCE disabled<br>0b01: adaptive with CCE disabled<br>0b10: differential with CCE disabled<br>0b11: standard with CCE enabled |
|   CS<br>}<br>If(MFM=0, 1, 5){ | [1] | Codebook subset |
|   Measurement Method Indication | [1] | 0b0: Use the midamble for CQI measurements<br>0b1: Use pilots in OL region with MaxMt streams for CQI measurements |
| }<br>Padding<br>MCRC<br>} | Variable<br>[16]<br>— | Padding to reach byte boundary<br>16 bit CRC masked by Station ID<br>— |

The definition of fields forming the feedback allocation A-MAP IE of Table 1 is as follows.

Channel index: define an index on the uplink resources of a feedback channel on which UE transmits feedback information. Here, a 1 to 1 relationship is set up between the relevant UE and the channel index. That is, feedback channels allocated to UEs do not overlap with each other.

Short-term feedback period: define the period where short-term feedback information that is varied relatively frequently according to a channel environment, from among pieces of feedback information, is transmitted. The short-term feedback information may include a CQI, a precoding matrix indicator (PMI), etc. The short-term feedback information is transmitted every $2^p$ frames according to the short-term feedback period.

Long-term feedback period: define the period where long-term feedback information that is not varied frequently, from among pieces of feedback information, is transmitted. The long-term feedback information may include a subband index, an MIMO feedback mode, etc. The long-term feedback information is transmitted every $2^q$ frames according to the long-term feedback period, and the long-term feedback information is not transmitted when q=0.

Allocation duration: define the allocation duration of a feedback channel.

Assuming that the value of a field indicating the allocation duration is d, feedback channels are allocated as much as $8 \times 2^d$ frames. When d=0b000, the feedback channels are released. When d=0b111, the feedback channels remain continued until a release command is received from a BS.

ACK allocation flag: A field for allocating an ACK channel on which a message to check the release of a feedback channel is transmitted. When d indicating the allocation duration is d=0b000, the value of the ACK allocation flag is 0b1. If the channel index of a feedback channel newly allocated is identical with the channel index of a released feedback channel even when d is not d=0b000, the value of the ACK allocation flag is set to 0b1.

MIMO feedback mode (MFM): define an MIMO feedback mode, and the MFM may be defined by Table 2 to be described later.

Feedback format: define a feedback format index when feedback information is transmitted through a feedback channel. The feedback format index may indicate a type of feedback information, etc. Feedback formats according to different MIMO feedback modes may be defined by Tables 3 to 7 to be described later.

frequency partition indication (FPI): indicate information about a frequency partition that measures feedback information to be transmitted in the short-term feedback period. When the number of frequency partitions is 1, the FPI field may do not exist.

Long-term FPI: indicate information about another frequency partition that measures feedback information to be transmitted in the long-term feedback period. When the number of frequency partitions is 1, the long-term FPI field does not exist, and when the number of frequency partitions is 2, it is implicitly signalized by the FPI field.

MaxMt: indicate a maximum number of ranks or a maximum number of scheduled users according to the MIMO feedback mode.

codebook mode (CM): indicate a codebook feedback mode.

measurement method indication: indicate a midamble or a pilot for CQI measurement.

The MIMO feedback mode may support MIMO transmission. When a BS allocates feedback channels, the BS informs UE of an MIMO feedback mode, and the UE transmits feedback information according to the MIMO feedback mode. Table 2 is an example of MIMO feedback modes and MIMO transmission modes supported according to the MIMO feedback modes.

TABLE 2

| Feedback Mode | Description | Feedback contents | Type of RU | Supported MIMO transmission mode |
|---|---|---|---|---|
| Mode 0 | OL SU MIMO SFBC/SM (Diversity) | 1. STC Rate<br>2. Wideband CQI | Diversity(DRU, Mini-band based CRU) | MIMO mode 0 and MIMO mode 1. Flexible adaptation between the two modes STC Rate = 1: SFBC CQI STC Rate 2: SM CQI In DRU: Mt = 2 for SM.In Miniband based CRU: Mt >= 2 for SM |
| Mode 1 | OL SUMIMO SM (Diversity) | 1. STC Rate<br>2. Wideband CQI | Diversity(Mini-band based CRU) | MIMO mode 1 |
| Mode 2 | OL SUMIMO SM (localized) | 1. STC Rate<br>2. Subband CQI<br>3. Subband Selection | Localized (Subband based CRU, Mini-band based CRU) | MIMO mode 1 |
| Mode 3 | CL SU MIMO (localized) | 1. STC Rate<br>2. Subband CQI<br>3. Subband PMI<br>4. Subband selection<br>[5. Wideband PMI]<br>6. Wideband correlation Matrix | Localized (Subband based CRU, Mini-band based CRU) | MIMO mode 2 |
| Mode 4 | CL SU MIMO (Diversity) | 1. Wideband CQI<br>[2. Wideband PMI]<br>3. Wideband correlation Matrix | Diversity(Mini-band based CRU) | MIMO mode 2 (Mt = 1) |
| Mode 5 | OL MU MIMO (localized) | 1. Subband CQI<br>2. Subband Selection<br>3. Stream indicator | Localized (Subband based CRU, Mini-band based CRU) | MIMO mode 3 |
| Mode 6 | CL MU MIMO (localized) | 1. Subband CQI<br>2. Subband PMI<br>3. Subband Selection<br>[4. Wideband PMI]<br>5. Wideband correlation Matrix | Localized (Subband based CRU, Mini-band based CRU) | MIMO mode 4 |
| Mode 7 | CL MU MIMO (Diversity) | 1. Wideband CQI<br>[2. Wideband PMI]<br>3. Wideband correlation Matrix | Diversity (Mini-band based CRU) | MIMO mode 4 |

Referring to Table 2, a supported MIMO transmission mode differs according to each MIMO feedback mode. For example, the MIMO feedback mode 0 supports the application of an open loop-single user (OL-SU) MIMO space-frequency block code (SFBC) and spatial multiplexing (SM) within diversity permutation. UE measures a wideband CQI for an SFBC and SM and reports a CQI and a space time coding (STC) rate to a BS. The MIMO feedback mode 3 supports a closed loop-single user (CL-SU) MIMO environment within localized permutation for frequency selective scheduling. The MIMO feedback mode 5 supports an open loop-multi user (OL-MU) MIMO environment within localized permutation for frequency selective scheduling. The MIMO feedback mode 7 supports a closed loop-multi user (CL-MU) MIMO environment within diversity permutation using wideband beamforming.

An FFBCH carries the feedbacks of a CQI and/or MIMO information, and it may be divided two types; a primary fast feedback channel (PFBCH) and a secondary fast feedback channel (SFBCH). The PFBCH carries information of 4 to 6 bits and provides a wideband CQI and/or MIMO feedback. The SFBCH carries information of up to 24 bits and provides a narrowband CQI and/or MIMO feedback. The SFBCH can support more control information bits by using a higher code rate. The PFBCH supports non-coherent detection not using a pilot, and the SFBCH supports coherent detection using a pilot. The FFBCH is started at a predetermined position, and the size of the FFBCH may be defined by a downlink control signal. The FFBCH may be periodically allocated. The number of FFBCHs allocated to UE by a BS may be 1 or lower.

A feedback format defines a type of feedback information transmitted by an FFBCH. The feedback format may be differently defined according to an MIMO feedback mode. That is, feedback information may be differently configured according to the MIMO feedback mode, and the period where the relevant feedback information is transmitted may be differently set.

Table 3 is an example of feedback formats when the MIMO feedback mode is any one of 0, 1, 4, and 7.

TABLE 3

| MFM | FBCH | # reports | Feedback Fields | | Size in bits | Description/Notes |
|---|---|---|---|---|---|---|
| 0 | PFBCH | 2 | Short | Wideband CQI and STC rate | N/A | Joint encoding of CQI and STC rate Encoding type 0 |
| | | | Long | Wideband CQI and STC rate | N/A | Joint encoding of CQI and STC rate |

TABLE 3-continued

| MFM | FBCH | # reports | | Feedback Fields | Size in bits | Description/Notes |
|---|---|---|---|---|---|---|
| 1 | PFBCH | 2 | Short | Wideband CQI and STC rate | N/A | Encoding type 0 Long term FPI for FFR Joint encoding of CQI and STC rate |
|  |  |  | Long | Wideband CQI and STC rate | N/A | Encoding type 0 Joint encoding of CQI and STC rate |
| 4 | PFBCH | 2 | Short | Wideband CQI | N/A | Encoding type 0 Long term FPI for FFR STC rate = 1 |
|  |  |  | Long | Wideband PMI | N/A | Encoding type 0 PMI for rank 1 Encoding type 2 |
| 7 | PFBCH | 2 | Short | Wideband CQI | N/A | STC rate = 1 Encoding type 0 |
|  |  |  | Long | Wideband PMI | N/A | PMI for rank 1 Encoding type 2 |

When the MIMO feedback mode is 0, 1, 4, or 7, feedback information about the entire measured wideband is transmitted. Here, a PFBCH is used as a feedback channel for carrying the feedback information. A wideband CQI and an STC rate may be transmitted every frame without long-term feedback information or a wideband PMI may be transmitted as long-term feedback information.

Table 4 is an example of feedback formats when the MIMO feedback mode is 2.

TABLE 4

| Feedback Format | FBCH | # reports | | Feedback Fields | Size in bits | Description/Notes |
|---|---|---|---|---|---|---|
| 0 (M = 1) | PFBCH | 2 | Short | Subband CQI and STC rate (rate = 1 and 2) | N/A | Joint encoding of CQI and STC rate with PFBCH PFBCH encoding Type 0 |
|  |  |  | Long | Subband index | N/A | PFBCH encoding Type 1 |
| 1 (M = 1) | SFBCH | 1 |  | Subband index | 3, 4, or 5 | Subband index for 5, 10, or 20 MHz |
|  |  |  |  | Subband CQI | 4 |  |
|  |  |  |  | STC rate | 1~3 | Support of STC rate 1 to 8 |
|  |  |  |  | PFBCH indicator | 1 |  |
| 2 (M = 3) | SFBCH | 2 | Short | Subband avg CQI | 4 | Subband index for 5, 10, or 20 MHz |
|  |  |  |  | differential CQI | 2 × 3 = 6 |  |
|  |  |  | Long | Subband index | 5, 8 or 11 |  |
|  |  |  |  | Wideband STC rate | 1~3 |  |
|  |  |  |  | PFBCH indicator | 1 |  |
| 3 (M = 5) | SFBCH | 2 | Short | Subband avg CQI | 4 |  |
|  |  |  |  | differential CQI | 2 × 5 = 10 |  |
|  |  |  | Long | Subband index | 3, 10, or 16 |  |
|  |  |  |  | Wideband STC rate | 1~3 |  |
|  |  |  |  | PFBCH indicator | 1 |  |

The MIMO feedback mode 2 supports open loop MIMO. Here, narrowband feedback information is transmitted. That is, the feedback information may be measured in selected 1, 3, or 5 subbands (M in Table 4) and transmitted through a PFBCH or an SFBCH. The feedback information is transmitted through the PFBCH when M=1 and is transmitted through the SFBCH when M=3 or 5. A CQI in a selected subband is transmitted as short-term feedback information, and a subband index is transmitted as long-term feedback information.

Table 5 is an example of feedback formats when the MIMO feedback mode is 3.

TABLE 5

| Feedback Format | FBCH | # reports | | Feedback Fields | Size in bits | Description/Notes |
|---|---|---|---|---|---|---|
| 0 (M = 1) | PFBCH | 3 | Short | Subband CQI | N/A | PFBCH encoding Type 0 |
|  |  |  | Short | Subband PMI | N/A | PFBCH encoding Type 2 |
|  |  |  | Long | Subband index | N/A | PFBCH encoding Type 1 |
| 1 (M = 2) | SFBCH | 2 | Short | Subband differential CQI | 2 × 2 | Subband index for 5, 10, or 20 MHz |
|  |  |  |  | Subband PMI | (3~6) × 2 |  |
|  |  |  | Long | Subband index | 4, 7 or 9 |  |
|  |  |  |  | Wideband STC rate | 1~3 |  |

TABLE 5-continued

| Feedback Format | FBCH | # reports | | Feedback Fields | Size in bits | Description/Notes |
|---|---|---|---|---|---|---|
| | | | | Subband avg CQI | 4 | |
| | | | | PFBCH indicator | 1 | |
| 2 (M = 3) | SFBCH | 2 | Short | Subband differential CQI | 2 × 3 | |
| | | | | subband PMI | (3~6) × 3 | |
| | | | Long | Subband index | 5, 8 or 11 | |
| | | | | Wideband STC rate | 1~3 | |
| | | | | Subband avg CQI | 4 | |
| | | | | PFBCH indicator | 1 | |
| 3 (M = 4) | SFBCH | 2 | Short | Subband differential CQI | 2 × 4 | |
| | | | | Subband PMI | (3~4) × 4 | |
| | | | Long | Subband index | 4, 9 or 14 | |
| | | | | Wideband STC rate | 1~3 | |
| | | | | Subband avg CQI | 4 | |
| | | | | PFBCH indicator | 1 | |

The MIMO feedback mode 3 supports closed loop MIMO, and narrowband feedback information like the MIMO feedback mode 2 is transmitted. Here, a PMI in a selected subband other than a CQI in a selected subband may also be transmitted.

Table 6 is an example of feedback formats when the MIMO feedback mode is 5.

TABLE 6

| Feedback Format | FBCH | # Reports | | Feedback Fields | Size in bits | Description/Notes |
|---|---|---|---|---|---|---|
| 0 (M = 1) | SFBCH | 1 | Short | Subband index | 3, 4, or 5 | Subband index for |
| | | | | Subband CQI | 4 | 5, 10, or 20 MHz |
| | | | | Stream Index | 1~2 | |
| | | | | PFBCH indicator | 1 | |
| 1 (M = 2) | SFBCH | 2 | Short | Subband avg_CQI | 4 | |
| | | | | Subband differential CQI | 2 × 2 = 4 | |
| | | | | Stream Index | (1-2) × 2 | |
| | | | Long | Subband index | 4, 7, or 9 | Subband index for |
| | | | | PFBCH indicator | 1 | 5, 10, or 20 MHz |
| 2 (M = 3) | SFBCH | 2 | Short | Subband avg_CQI | 4 | |
| | | | | Subband differential CQI | 2 × 3 = 6 | |
| | | | | Stream Index | 3 × (1~2) | |
| | | | Long | Subband index | 5, 8, or 11 | Subband index for |
| | | | | PFBCH indicator | 1 | 5, 10, or 20 MHz |
| 3 (M = 5) | SFBCH | 3 | Short | Subband avg_CQI | 4 | |
| | | | | Subband differential CQI | 2 × 5 = 10 | |
| | | | | Stream Index | (1~2) × 5 | |
| | | | Long | Subband index | 3, 10, or 16 | Subband index for |
| | | | | PFBCH indicator | 1 | 5, 10, or 20 MHz |

Table 7 is an example of feedback formats when the MIMO feedback mode is 6.

TABLE 7

| Feedback Format | FBCH | # reports | | Feedback Fields | Size in bits | Description/Notes |
|---|---|---|---|---|---|---|
| 0 (M = 1) | PFBCH | 3 | Short | Subband CQI | N/A | PFBCH encoding Type 0 |
| | | | Short | Subband PMI | N/A | PFBCH encoding Type 2 |
| | | | Long | Subband index | N/A | PFBCH encoding Type 1 |
| 1 (M = 2) | SFBCH | 2 | Short | Subband avg_CQI | 4 | |
| | | | | Subband differential CQI | 2 × 2 = 4 | |
| | | | | Stream Index | (1~2) × 2 | |
| | | | Long | Subband index | 4, 7, or 9 | Subband index for |
| | | | | PFBCH indicator | 1 | 5, 10, or 20 MHz |
| 2 (M = 3) | SFBCH | 2 | Short | Subband avg_CQI | 4 | |
| | | | | Subband differential CQI | 2 × 3 = 6 | |
| | | | | Stream Index | 3 × (1~2) | |
| | | | Long | Subband index | 5, 8, or 11 | Subband index for |
| | | | | PFBCH indicator | 1 | 5, 10, or 20 MHz |

TABLE 7-continued

| Feedback Format | FBCH | # reports | | Feedback Fields | Size in bits | Description/Notes |
|---|---|---|---|---|---|---|
| 3 (M = 5) | SFBCH | 3 | Short | Subband avg_CQI | 4 | |
| | | | | Subband differential CQI | 2 × 5 = 10 | |
| | | | | Stream Index | (1~2) × 5 | |
| | | | Long | Subband index | 3, 10, or 16 | Subband index for |
| | | | | PFBCH indicator | 1 | 5, 10, or 20 MHz |

Figure 4:
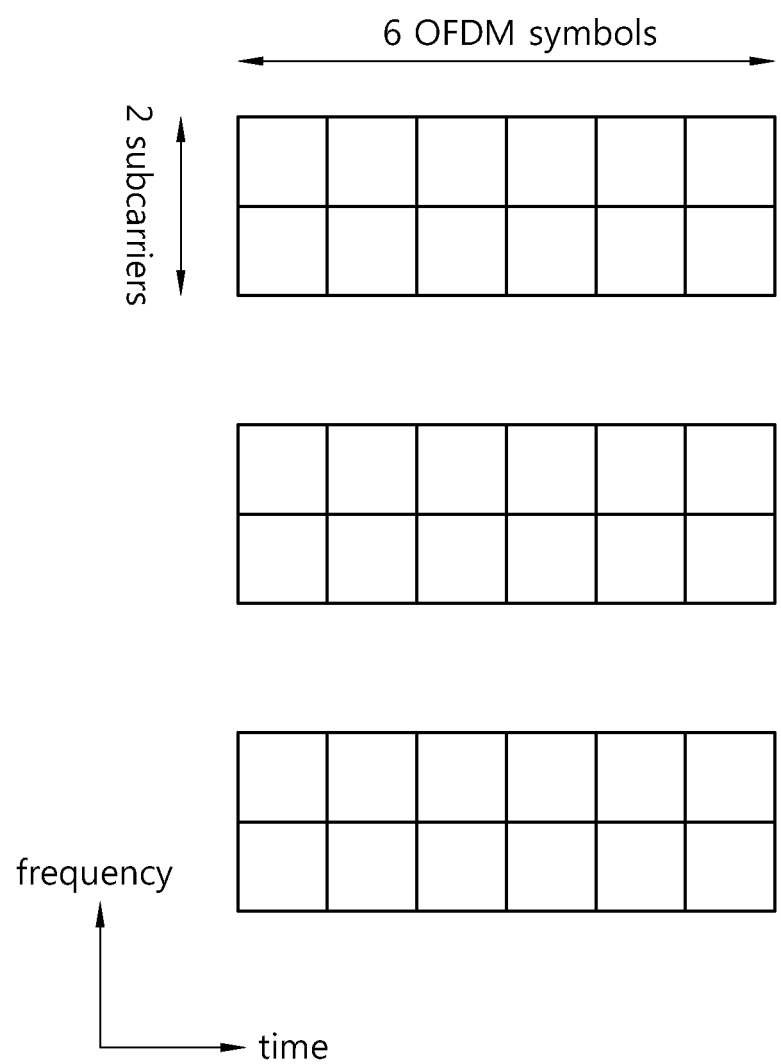
FIG. 4 shows an example of uplink resources used in the PFBCH.

FIG. 4 shows an example of uplink resources used in the PFBCH. The PFBCH may include 3 distributed uplink feedback mini-tiles (FMT5). The FMT may be defined by 2 contiguous subcarriers and 6 OFDM symbols. One resource unit, including 18 subcarriers and 6 OFDM symbols, may include 3 FFBCHs.

Figure 5:
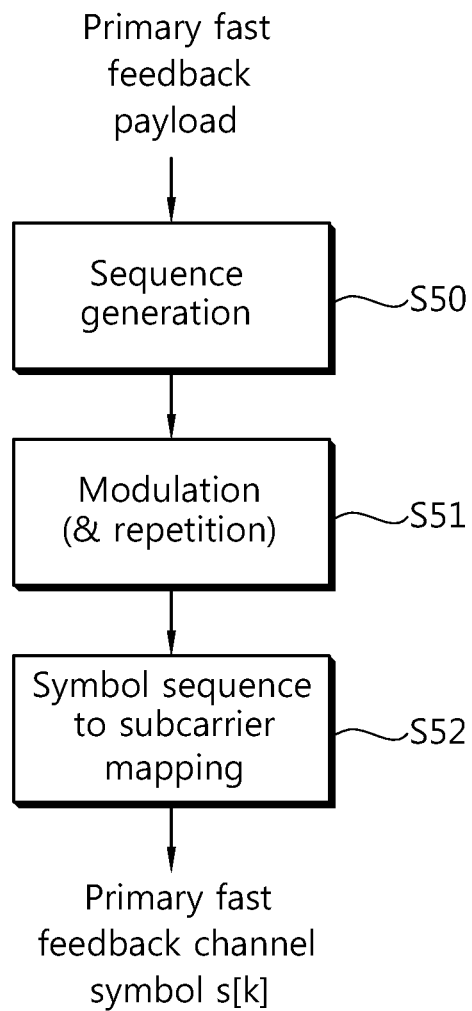
FIG. 5 is a block diagram showing a process in which feedback information is mapped to a PFBCH.

FIG. 5 is a block diagram showing a process in which feedback information is mapped to a PFBCH. At step S50, a PFBCH sequence is generated using a PFBCH payload. The PFBCH sequence may be selected from a predetermined PFBCH sequence set. Table 8 is an example of a PFBCH sequence set.

TABLE 8

| Index | Sequence |
|---|---|
| 0 | 111111111111 |
| 1 | 101111010110 |
| 2 | 011010111101 |
| 3 | 001010010100 |
| 4 | 101010101010 |
| 5 | 111010000011 |
| 6 | 001111101000 |
| 7 | 011111000001 |
| 8 | 110011001100 |
| 9 | 100011100101 |
| 10 | 010110001110 |
| 11 | 000110100111 |
| 12 | 100110011001 |
| 13 | 110110110000 |
| 14 | 000011011011 |
| 15 | 010011110010 |
| 16 | 101011111100 |
| 17 | 111011010101 |
| 18 | 001110111110 |
| 19 | 011110010111 |
| 20 | 111110101001 |
| 21 | 101110000000 |
| 22 | 011011101011 |
| 23 | 001011000010 |
| 24 | 100111001111 |
| 25 | 110111100110 |
| 26 | 000010001101 |
| 27 | 010010100100 |
| 28 | 110010011010 |
| 29 | 100010110011 |
| 30 | 010111011000 |
| 31 | 000111110001 |

TABLE 8-continued

| Index | Sequence |
|---|---|
| 32 | 101011001001 |
| 33 | 111011100000 |
| 34 | 001110001011 |
| 35 | 011110100010 |
| 36 | 100111111010 |
| 37 | 110111010011 |
| 38 | 000010111000 |
| 39 | 010010010001 |
| 40 | 111110011100 |
| 41 | 101110110101 |
| 42 | 011101011110 |
| 43 | 001011110111 |
| 44 | 101010011111 |
| 45 | 111010110110 |
| 46 | 001111011101 |
| 47 | 011111110100 |
| 48 | 111111001010 |
| 49 | 101111100011 |
| 50 | 011010001000 |
| 51 | 001010100001 |
| 52 | 110010101111 |
| 53 | 100010000110 |
| 54 | 010111101101 |
| 55 | 000111000100 |
| 56 | 100110101100 |
| 57 | 110110000101 |
| 58 | 000011101110 |
| 59 | 010011000111 |
| 60 | 110011111001 |
| 61 | 100011010000 |
| 62 | 010110111011 |
| 63 | 000110010010 |

At step S51, the generated PFBCH sequence is modulated, repeated, and mapped to an uplink PFBCH symbol s[k]. Here, 0 of the PFBCH sequence may be mapped to 1, and 1 thereof may be mapped to −1. At step S52, the uplink PFBCH symbol s[k] is mapped to the subcarriers of an FMT.

In transmitting a PFBCH, 4 encoding types may be defined. Encoding types corresponding to the MIMO feedback modes defined in the feedback allocation A-MAP IE and feedback formats may be used. An index value of 6 bits, corresponding to feedback information defined within each encoding type, may be transmitted through the PFBCH.

Table 9 is an example of the PFBCH encoding type 0.

TABLE 9

| Index | Content (Value) | Description/Notes |
|---|---|---|
| 0 | STC rate = 1, MCS = 0000 | |
| 1 | STC rate = 1, MCS = 0001 | |
| 2 | STC rate = 1, MCS = 0010 | |
| 3 | STC rate = 1, MCS = 0011 | |
| 4 | STC rate = 1, MCS = 0100 | |
| 5 | STC rate = 1, MCS = 0101 | |
| 6 | STC rate = 1, MCS = 0110 | |
| 7 | STC rate = 1, MCS = 0111 | |
| 8 | STC rate = 1, MCS = 1000 | |
| 9 | STC rate = 1, MCS = 1001 | |
| 10 | STC rate = 1, MCS = 1010 | |
| 11 | STC rate = 1, MCS = 1011 | |

TABLE 9-continued

| Index | Content (Value) | Description/Notes |
|---|---|---|
| 12 | STC rate = 1, MCS = 1100 | |
| 13 | STC rate = 1, MCS = 1101 | |
| 14 | STC rate = 1, MCS = 1110 | |
| 15 | STC rate = 1, MCS = 1111 | |
| 16 | STC rate = 2, MCS = 0000 | |
| 17 | STC rate = 2, MCS = 0001 | |
| 18 | STC rate = 2, MCS = 0010 | |
| 19 | STC rate = 2, MCS = 0011 | |
| 20 | STC rate = 2, MCS = 0100 | |
| 21 | STC rate = 2, MCS = 0101 | |
| 22 | STC rate = 2, MCS = 0110 | |
| 23 | STC rate = 2, MCS = 0111 | |
| 24 | STC rate = 2, MCS = 1000 | |
| 25 | STC rate = 2, MCS = 1001 | |
| 26 | STC rate = 2, MCS = 1010 | |
| 27 | STC rate = 2, MCS = 1011 | |
| 28 | STC rate = 2, MCS = 1100 | |
| 29 | STC rate = 2, MCS = 1101 | |
| 30 | STC rate = 2, MCS = 1110 | |
| 31 | STC rate = 2, MCS = 1111 | |
| 32 | STC rate = 3, MCS = 0100 | |
| 33 | STC rate = 3, MCS = 0101 | |
| 34 | STC rate = 3, MCS = 0110 | |
| 35 | STC rate = 3, MCS = 0111 | |
| 36 | STC rate = 3, MCS = 1000 | |
| 37 | STC rate = 3, MCS = 1001 | |
| 38 | STC rate = 3, MCS = 1010 | |
| 39 | STC rate = 3, MCS = 1011 | |
| 40 | STC rate = 3, MCS = 1100 | |
| 41 | STC rate = 3, MCS = 1101 | |
| 42 | STC rate = 3, MCS = 1110 | |
| 43 | STC rate = 3, MCS = 1111 | |
| 44 | STC rate = 4, MCS = 1000 | |
| 45 | STC rate = 4, MCS = 1001 | |
| 46 | STC rate = 4, MCS = 1010 | |
| 47 | STC rate = 4, MCS = 1011 | |
| 48 | STC rate = 4, MCS = 1100 | |
| 49 | STC rate = 4, MCS = 1101 | |
| 50 | STC rate = 4, MCS = 1110 | |
| 51 | STC rate = 4, MCS = 1111 | |
| 52 | Reserved | |
| 53 | Reserved | |
| 54 | Reserved | |
| 55 | Event-driven Indicator (EDI) for Buffer management (80% full) | Event-driven for buffer management |
| 56 | Event-driven Indicator (EDI) for Buffer management (full) | |
| 57 | Event-driven Indicator (EDI) for request for switching MFM | Indicate request to switch MIMO feedback Mode between distributed and localized allocations |
| 58 | Event driven indicator (EDI) for frequency partition 0 indication (reuse-1) | AMS informs ABS about the frequency partition index (for MIMO feedback modes 0, 1, 4, 7) |
| 59 | Event driven indicator (EDI) for frequency partition 1 indication (reuse-3) | |
| 60 | Event driven indicator (EDI) for frequency partition 2 indication (reuse-3) | |
| 61 | Event driven indicator (EDI) for frequency partition 3 indication (reuse-3) | |
| 62 | Event-driven Indicator (EDI) for Bandwidth Request Indicator (sequence 1) | Event-driven Indicator for Bandwidth request |
| 63 | Event-driven Indicator (EDI) for Bandwidth Request Indicator (sequence 2) | |

According to Table 9, the PFBCH encoding type 0 indicates the STC rate and the modulation and coding scheme (MCS) level of a measured channel.

Table 10 is an example of the PFBCH encoding type 1.

TABLE 10

| Index | Content (Value) | Description/Notes |
|---|---|---|
| 0 | Subband index 0 | Subband index for Best-1 subband (refer 15.3.9.3.1.4 feedback format) |
| 1 | Subband index 1 | |
| 2 | Subband index 2 | |

TABLE 10-continued

| Index | Content (Value) | Description/Notes |
|---|---|---|
| 3 | Subband index 3 | |
| 4 | Subband index 4 | |
| 5 | Subband index 5 | |
| 6 | Subband index 6 | |
| 7 | Subband index 7 | |
| 8 | Subband index 8 | |
| 9 | Subband index 9 | |
| 10 | Subband index 10 | |
| 11 | Subband index 11 | |
| 12 | Reserved | Reserved |
| ... | ... | |
| 54 | Reserved | |
| 55 | Event-driven Indicator (EDI) for Buffer management (80% full) | Event-driven for buffer management |
| 56 | Event-driven Indicator (EDI) for Buffer management (full) | |
| 57 | Event-driven Indicator (EDI) for request for switching MFM | Indicate request to switch MIMO feedback Mode between distributed and localized allocations |
| 58 | Event driven indicator (EDI) for frequency partition 0 indication (reuse-1) | AMS informs ABS about the frequency partition index (for MIMO feedback modes 0, 1, 4, 7) |
| 59 | Event driven indicator (EDI) for frequency partition 1 indication (reuse-3) | |
| 60 | Event driven indicator (EDI) for frequency partition 2 indication (reuse-3) | |
| 61 | Event driven indicator (EDI) for frequency partition 3 indication (reuse-3) | |
| 62 | Event-driven Indicator (EDI) for Bandwidth Request Indicator (sequence 1) | Event-driven Indicator for Bandwidth request |
| 63 | Event-driven Indicator (EDI) for Bandwidth Request Indicator (sequence 2) | |

According to Table 10, the PFBCH encoding type 1 indicates the index of a best-1 subband whose narrowband CQI will be measured.

The PFBCH encoding type 2 is used for a PMI report.

Figure 6:
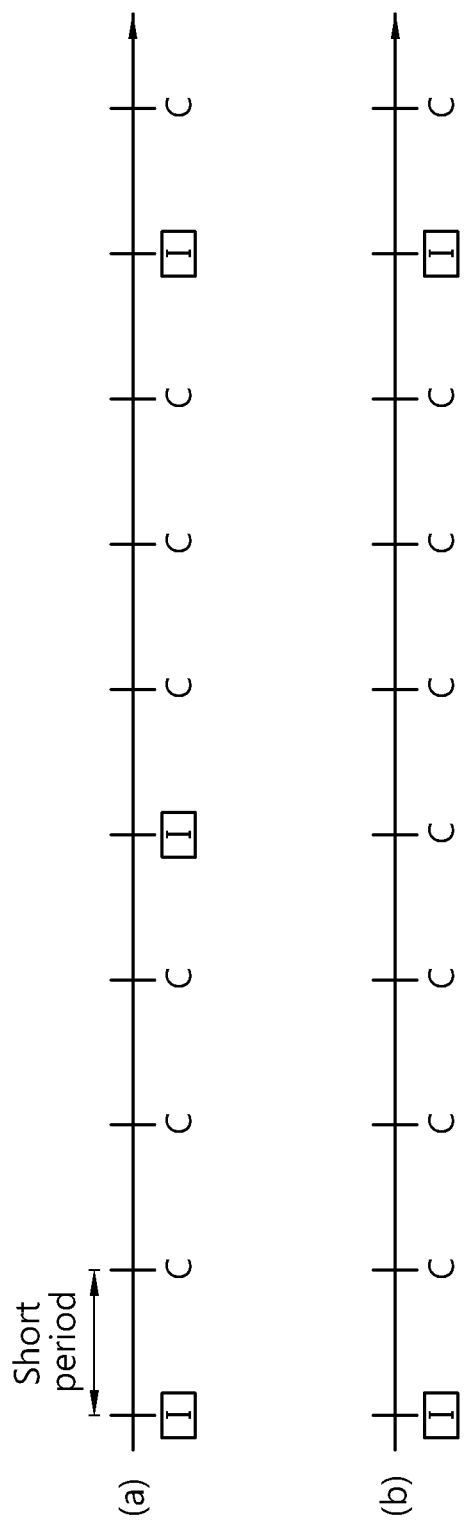
FIGS. 6 and 7 show examples of cases where short-term feedback information and long-term feedback information are transmitted through feedback channels.A
Figure 7:
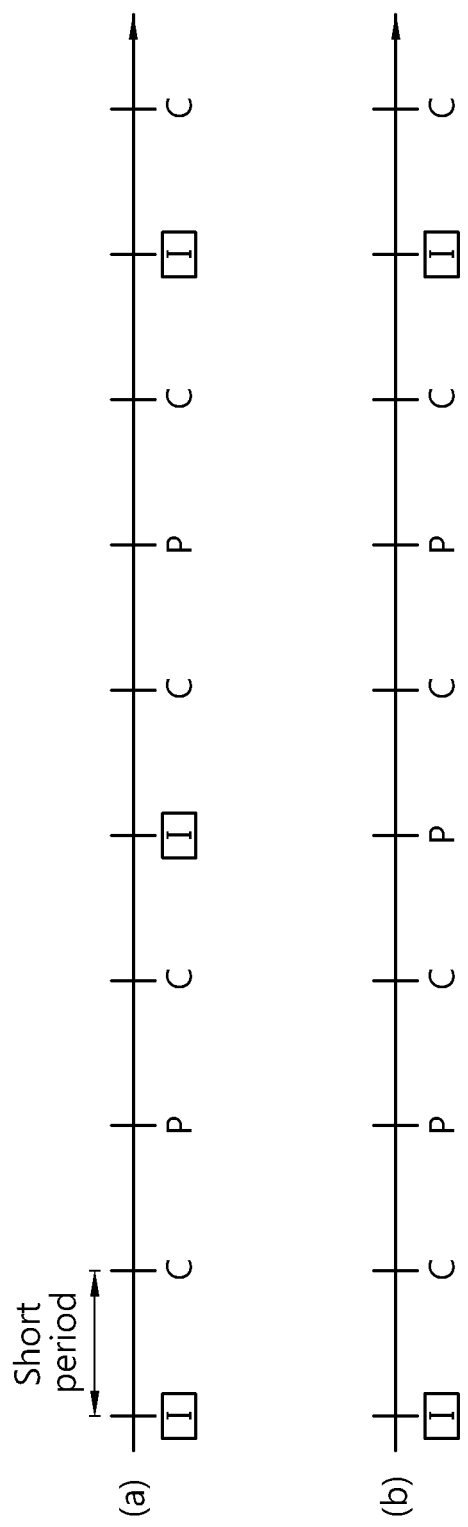

FIGS. 6 and 7 show examples of cases where short-term feedback information and long-term feedback information are transmitted through feedback channels.

FIG. 6 is a case where feedback information is transmitted when the MIMO feedback mode is 2. In FIG. 6-(a), a narrowband CQI is transmitted every frame as short-term feedback information, and a subband index is transmitted every 4 frames as long-term feedback information. Likewise, in FIG. 6-(b), a narrowband CQI is transmitted every frame as short-term feedback information, and a subband index is transmitted every 8 frames as long-term feedback information. If the short-term feedback information and the long-term feedback information overlap with each other, the long-term feedback information is first transmitted. Although the short-term feedback information is punctured owing to the long-term feedback information, however, the feedback information can be transmitted without any problem because the short-term feedback information is transmitted in 3 frames of 4 frames and 7 frames of 8 frames.

FIG. 7 is a case where feedback information is transmitted when the MIMO feedback mode is 3 or 6. In FIG. 7-(a), a narrowband CQI and a narrowband PMI are alternately transmitted every 2 frames as short-term feedback information, and a subband index is transmitted every 4 frames as long-term feedback information. If the short-term feedback information and the long-term feedback information overlap with each other, the long-term feedback information is first transmitted. Here, the subband index (i.e., the long-term feedback information) is always transmitted in a frame where the narrowband PMI is transmitted, from the short-term feedback information, and consequently the narrowband PMI is transmitted every 4 frames. Furthermore, since the narrowband PMI is transmitted every 4 frames, the narrowband CQI and the narrowband PMI are not alternately transmitted and thus a PMI measured based on the CQI may not be properly calculated. Likewise, in FIG. 7-(b), a narrowband CQI and a narrowband PMI are alternately transmitted every 2 frames as short-term feedback information, and a subband index is transmitted every 8 frames as long-term feedback information. If the short-term feedback information and the long-term feedback information overlap with each other, the long-term feedback information is first transmitted. The narrowband PMI is not transmitted every 4 frames as in FIG. 7-(a), but there is still a problem that the narrowband PMI is not properly calculated because the narrowband CQI is continuously transmitted on both sides of a frame where the long-term feedback information is transmitted instead of the narrowband PMI. Accordingly, it is necessary to propose a feedback transmission method for improving the problem.

Figure 8:
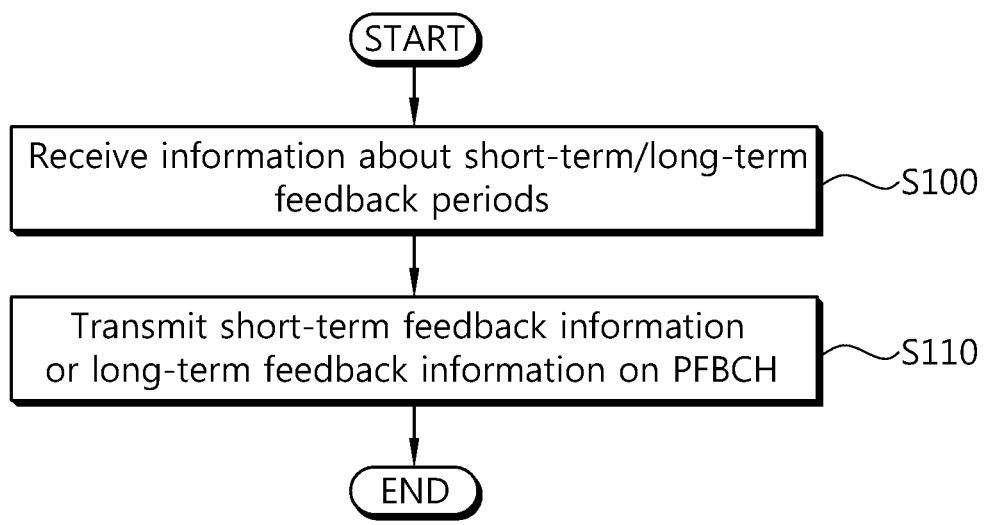
FIG. 8 is an embodiment of a proposed feedback transmission method.

FIG. 8 is an embodiment of a proposed feedback transmission method.

At step S100, UE receives information on a short-term feedback period and a long-term feedback period from a BS. At step S110, the UE transmits short-term feedback information by the short-term feedback period or long-term feedback information by the long-term feedback period to the BS on a primary fast feedback channel (PFBCH). Here, the long-term feedback information includes the index of a subband (i.e., the subject of channel measurement) and a difference measurement value (i.e., a difference between a reference channel measurement value and a measured channel measurement value).

In order to implement the proposed feedback transmission method, the PFBCH encoding type 1 may be reconfigured in Table 10. That is, the remaining 55 indices other than indices allocated for event-driven may be used to indicate subband indices and ΔCQI because feedback information corresponding to the index 13 to the index 54 does not exist in the current PFBCH encoding type 1. Assuming that the number of subbands (i.e., a basic unit of feedback) is N and the number of levels of ΔCQI is P, the PFBCH encoding type 1 may be reconfigured so that N*P≤55 is obtained. For example, P may be 4 when N=12 and P may be 2 when N=24. Table 11 is an example of the reconfigured PFBCH encoding type 1.

TABLE 11

| Index | Information |
|---|---|
| 0 | $1^{st}$ subband, $1^{st}$ delta CQI |
| 1 | $1^{st}$ subband, $2^{nd}$ delta CQI |
| 2 | $1^{st}$ subband, $3^{rd}$ delta CQI |
| 3 | $1^{st}$ subband, $4^{th}$ delta CQI |
| 4 | $2^{nd}$ subband, $1^{st}$ delta CQI |
| 5 | $2^{nd}$ subband, $2^{nd}$ delta CQI |
| 6 | $2^{nd}$ subband, $3^{rd}$ delta CQI |
| 7 | $2^{nd}$ subband, $4^{th}$ delta CQI |
| 8 | $3^{rd}$ subband, $1^{st}$ delta CQI |
| 9 | $3^{rd}$ subband, $2^{nd}$ delta CQI |
| 10 | $3^{rd}$ subband, $3^{rd}$ delta CQI |
| 11 | $3^{rd}$ subband, $4^{th}$ delta CQI |
| ... | |
| 47 | $12^{th}$ subband, $4^{th}$ delta CQI |
| 48-54 | reserved |

Referring to Table 11, the index of the PFBCH encoding type 1, indicating only the subband index in Table 10, also indicates ΔCQI. When the number of subbands is 12 and the number of levels of ΔCQI is 4, 4 ΔCQI levels in each subband may be indicated through different indices. Here, ΔCQI is a difference with a previously transmitted CQI and may be a difference with a physical carrier-to-interference plus noise ratio (CINR) or a difference with an effective CINR. If ΔCQI is a difference with the physical CINR, ΔCQI is represented as actual power (i.e., a dB value). If ΔCQI is a difference with the effective CINR, ΔCQI is represented as a difference between MCS levels.

The embodiment corresponds to a case where short-term feedback information punctured by long-term feedback information is a narrowband CQI. If the punctured short-term feedback information is the narrowband PMI, ΔPMI, not ΔCQI, may configure the long-term feedback information along with a subband index. Here, ΔPMI may mean a difference between a PMI previously transmitted and a PMI to be fed back. Alternatively, ΔPMI may be a PMI selected from a differential codebook. Alternatively, ΔPMI may be an index difference between a PMI previously transmitted and a PMI to be fed back when PMIs are arranged in order of higher correlation. For example, it is assumed that that a PMI previously transmitted is a PMI index 2 and correlations with the PMI index 2 are arranged in descending powers {PMI2, PMI1, PMI4, PMI8, PMI7, PMI3, PMI5, PMI6}. If the PMI to be fed back is a PMI index 4, 2 (i.e., an index difference with a PMI2) may be transmitted. If the PMI to be fed back is a PMI index 2, 0 (i.e., an index difference with a PMI 2) may be transmitted.

Alternatively, a method of controlling the long-term feedback period may be proposed.

Figure 9:
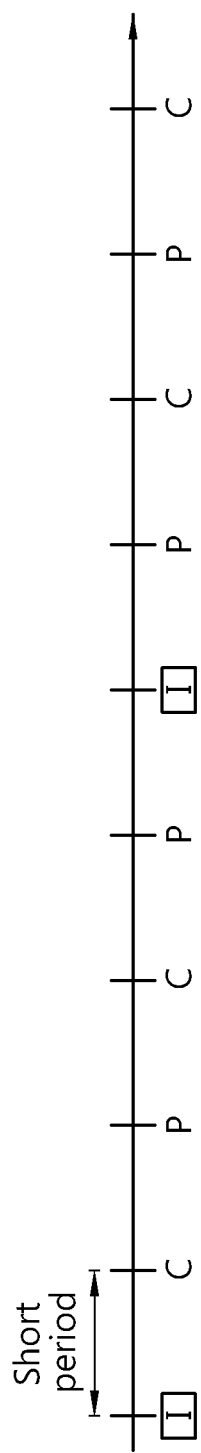
FIGS. 9 and 10 are examples of a case where feedback information is transmitted according to a proposed method of transmitting feedback allocation information.

FIG. 9 is an example of a case where feedback information is transmitted according to a proposed method of transmitting feedback allocation information.

A long-term feedback period may be determined as an odd-numbered multiple not a $2^n$ multiple of a short-term feedback period. For example, in FIG. 9, the short-term feedback period is determined as 1 and the long-term feedback period is determined as 5. A narrowband CQI and a narrowband PMI are alternately transmitted as short-term feedback information every frame, and a subband index is transmitted as long-term feedback information every 5 frames. In the frames where the long-term feedback information is transmitted, the transmission of the short-term feedback information is punctured, but the narrowband CQI and the narrowband PMI are alternately punctured. Table 12 shows an example in which the feedback allocation A-MAP IE according to the proposed feedback transmission method has been reconfigured.

TABLE 12

| Short-term Feedback Period (p) | [3] | A feedback is transmitted on the FBCH every $2^p$ frames |
|---|---|---|
| Long-term Feedback Period (q) | [2] | A long-term feedback is transmitted on the FBCH every 5 * q short-term feedback opportunity If q = 0b00, long-term feedback is not used. |

If a plurality of pieces of information is alternately transmitted as the short-term feedback information since the long-term feedback period is determined as an odd-numbered multiple of the short-term feedback period, a problem that the short-term feedback information is not transmitted in the short-term feedback period can be solved because the relevant short-term feedback information is alternately punctured. However, there is still a problem that another piece of short-term feedback information not transmitted is not properly measured in that the same short-term feedback information is transmitted on both sides of a frame on which the long-term feedback information is transmitted.

Figure 10:
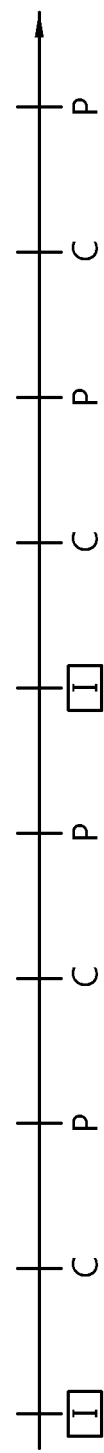

FIG. 10 is another example of a case where feedback information is transmitted according to a proposed method of transmitting feedback allocation information.

If two pieces of information, including a narrowband CQI and a narrowband PMI, are transmitted as short-term feedback information, the short-term feedback information is not transmitted every frame and the transmission of the short-term feedback information is not omitted in a frame on which long-term feedback information is transmitted, but the frame on which the long-term feedback information is transmitted may be first determined by a long-term feedback period and the short-term feedback information may be alternately transmitted between the pieces of long-term feedback information. In FIG. 10, a subband index is transmitted as long-term feedback information every 5 frames. After the long-term feedback information is transmitted, a narrowband CQI and a narrowband PMI are alternately transmitted as short-term feedback information. Next, the long-term feedback information is transmitted and the narrowband CQI and the narrowband PMI are alternately transmitted again as the short-term feedback information. The embodiment of FIG. 10 may be used in the feedback format 0 when the MIMO feedback mode is 3 or 6.

Figure 11:
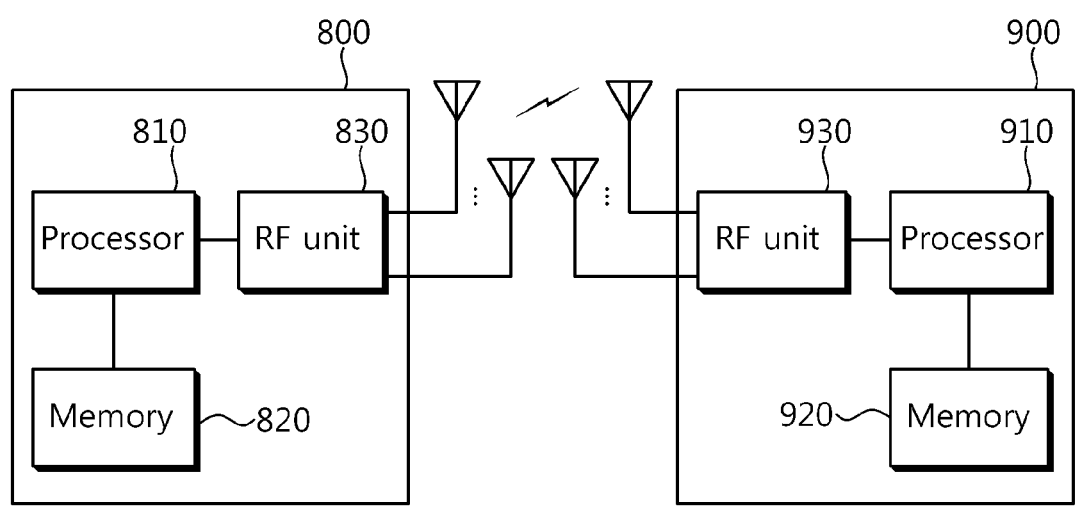
FIG. 11 is a block diagram showing a BS and UE in which the embodiments of the present invention are implemented.

FIG. 11 is a block diagram showing a BS and UE in which the embodiments of the present invention are implemented.

The BS 800 includes a processor 810, memory 820, and a radio frequency (RF) unit 830. The processor 810 implements the proposed functions, processes, and/or methods. The processor 810 processes the feedback allocation A-MAP IE. The layers of a radio interface protocol may be implemented by the processor 810. The memory 820 is coupled to the processor 810, and it stores various pieces of information for driving the processor 810. The RF unit 830 is coupled to the processor 810, and it transmits and/or receives radio signals and transmits the feedback allocation A-MAP IE.

The UE 900 includes a processor 910, memory 920, and an RF unit 930. The RF unit 930 is coupled to the processor 910, and it receives information on a short-term feedback period and a long-term feedback period and transmits short-term feedback information by a short-term feedback period or long-term feedback information by a long-term feedback period on a PFBCH. The processor 910 implements the proposed functions, processes, and/or methods. The processor 910 processes a feedback allocation A-MAP IE, including information about the short-term feedback period and the long-term feedback period, and processes the short-term feedback information and the long-term feedback information. The layers of a radio interface protocol may be implemented by the processor 910. The memory 920 is coupled to the processor 910, and it stores various pieces of information for driving the processor 910.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed is:

1. A method of transmitting a feedback in a wireless communication system, the method comprising:
    receiving information on a short-term feedback period and a long-term feedback period from a base station; and
    transmitting short-term feedback information by the short-term feedback period or long-term feedback information by the long-term feedback period to the base station on a primary fast feedback channel (PFBCH),
    wherein the long-term feedback information comprises an index of a subband which is a subject of channel measurement and a difference measurement value which is a difference between a reference channel measurement value and a measured channel measurement value,
    wherein the long-term feedback information is the index of the subband and an index indicating feedback information of a PFBCH encoding type 1 corresponding to the difference measurement value,
    wherein the index indicating the feedback information of the PFBCH encoding type 1 is an integer which is one of 1 to 55,
    wherein the difference measurement value is a difference value between a previously transmitted channel quality indicator (CQI) and a measured CQI; and
    wherein transmitting the short-term feedback information or the long-term feedback information comprises generating a feedback sequence based on the short-term feedback information or the long-term feedback information; mapping the generated feedback sequence to a feedback symbol by modulating and repeating the generated feedback sequence; and mapping the feedback symbol to subcarriers allocated to the feedback channel.

2. The method of claim 1, wherein the difference measurement value is represented by a difference of actual transmission power or by a difference of a modulation and coding scheme (MCS) level.

3. The method of claim 1, wherein the difference measurement value is a difference between a previously transmitted precoding matrix indicator (PMI) and a measured PMI.

4. The method of claim 1, wherein the difference measurement value is an index difference when a correlation between a previously transmitted PMI and a measured PMI is represented by an index.

5. The method of claim 1, wherein the long-term feedback period is an odd-numbered multiple of the short-term feedback period.

6. An apparatus for transmitting a feedback in a wireless communication system, the apparatus comprising:
    a radio frequency (RF) unit configured for receiving information on a short-term feedback period and a long-term feedback period and to transmit short-term feedback information by the short-term feedback period or long-term feedback information by the long-term feedback period on a primary fast feedback channel (PFBCH), and
    a processor, coupled to the RF unit, configured for processing the short-term feedback information or the long-term feedback information,
    wherein the long-term feedback information comprises an index of a subband which is a subject of channel measurement and a difference measurement value which is a difference between a reference channel measurement value and a measured channel measurement value,
    wherein the long-term feedback information is the index of the subband and an index indicating feedback information of a PFBCH encoding type 1 corresponding to the difference measurement value,
    wherein the index indicating the feedback information of the PFBCH encoding type 1 is an integer which is one of 1 to 55,
    wherein the difference measurement value is a difference value between a previously transmitted channel quality indicator (CQI) and a measured CQI, and
    wherein the RF unit, in transmitting the short-term feedback information or the long-term feedback information, is further configured to generate a feedback sequence based on the short-term feedback information or the long-term feedback information; map the generated feedback sequence to a feedback symbol by modulating and repeating the generated feedback sequence; and map the feedback symbol to subcarriers allocated to the feedback channel.

7. The apparatus of claim 6, wherein the difference measurement value is a difference between a previously transmitted precoding matrix indicator (PMI) and a measured PMI.

8. The apparatus of claim 6, wherein the long-term feedback period is an odd-numbered multiple of the short-term feedback period.

* * * * *